United States Patent
Payne

(10) Patent No.: US 6,562,177 B1
(45) Date of Patent: May 13, 2003

(54) STRUCTURE FORMING METHOD, APPARATUS AND PRODUCT

(76) Inventor: LeRoy Payne, 4336 Christensen Rd., Billings, MT (US) 59101

( * ) Notice: Subject to any disclaimer, the term of this patent is extended or adjusted under 35 U.S.C. 154(b) by 0 days.

(21) Appl. No.: 09/830,369
(22) PCT Filed: Sep. 20, 1999
(86) PCT No.: PCT/US99/21675
§ 371 (c)(1), (2), (4) Date: Apr. 26, 2001
(87) PCT Pub. No.: WO00/26478
PCT Pub. Date: May 11, 2000

Related U.S. Application Data

(63) Continuation-in-part of application No. PCT/US98/23034, filed on Oct. 30, 1998, which is a continuation-in-part of application No. PCT/US96/15499, filed on Sep. 26, 1996, which is a continuation-in-part of application No. PCT/US96/05132, filed on May 20, 1996, which is a continuation-in-part of application No. PCT/US95/05450, filed on May 4, 1995, now Pat. No. 5,725,716, which is a continuation-in-part of application No. 08/239,540, filed on May 9, 1994, now Pat. No. 5,496,434, which is a continuation-in-part of application No. 07/870,927, filed on Apr. 20, 1992, now Pat. No. 5,330,603, which is a continuation-in-part of application No. 07/753,344, filed on Aug. 30, 1991, now Pat. No. 5,145,282, which is a continuation-in-part of application No. 07/521,442, filed on May 10, 1990, now Pat. No. 5,049,006, which is a continuation-in-part of application No. 07/417,501, filed on Oct. 5, 1989, now Pat. No. 4,955,760, which is a continuation-in-part of application No. 07/235,205, filed on Aug. 23, 1988, now Pat. No. 4,872,784.

(51) Int. Cl.$^7$ .............................................. B32B 31/00
(52) U.S. Cl. .................... 156/276; 156/324; 156/500; 156/538; 156/547; 156/549; 156/550
(58) Field of Search ................................. 156/276, 324, 156/500, 538, 547, 549, 550; 405/52, 270

(56) References Cited

U.S. PATENT DOCUMENTS

| | | | | |
|---|---|---|---|---|
| 4,405,264 A | * | 9/1983 | Brady et al. ................. | 405/270 |
| 4,828,432 A | * | 5/1989 | Ives ........................... | 156/574 |
| 5,639,331 A | * | 6/1997 | Payne ......................... | 156/242 |

FOREIGN PATENT DOCUMENTS

| | | |
|---|---|---|
| WO | WO-96/34743 A1 | * 11/1996 |
| WO | WO-97/38858 A1 | * 10/1997 |

* cited by examiner

Primary Examiner—Jeff H. Aftergut
(74) Attorney, Agent, or Firm—Arthur L. Urban

(57) ABSTRACT

A method of forming a continuous composite structure includes encapsulating solid additive particles with a first reactive liquid resin forming material and migrating part of the mixture through a porous blanket to form a continuous resin matrix within the blanket with adhesive outer surfaces. A thin coating of a second preselected resin forming material which substantially cures immediately upon application is applied over one major adhesive upper surface of the matrix/blanket while allowing an area of the adhesive surface to remain exposed along one edge of the upper surface thereof. A plurality of preselected flexible lengths of the coated matrix/blanket are individually positioned successively in an overlapping orientation with the exposed adhesive area of the upper surface of the adjoining positioned length tightly affixed to the adhesive lower surface of the succeeding length to form a continuous composite structure. Also, the composite structure and apparatus for producing same.

19 Claims, 1 Drawing Sheet

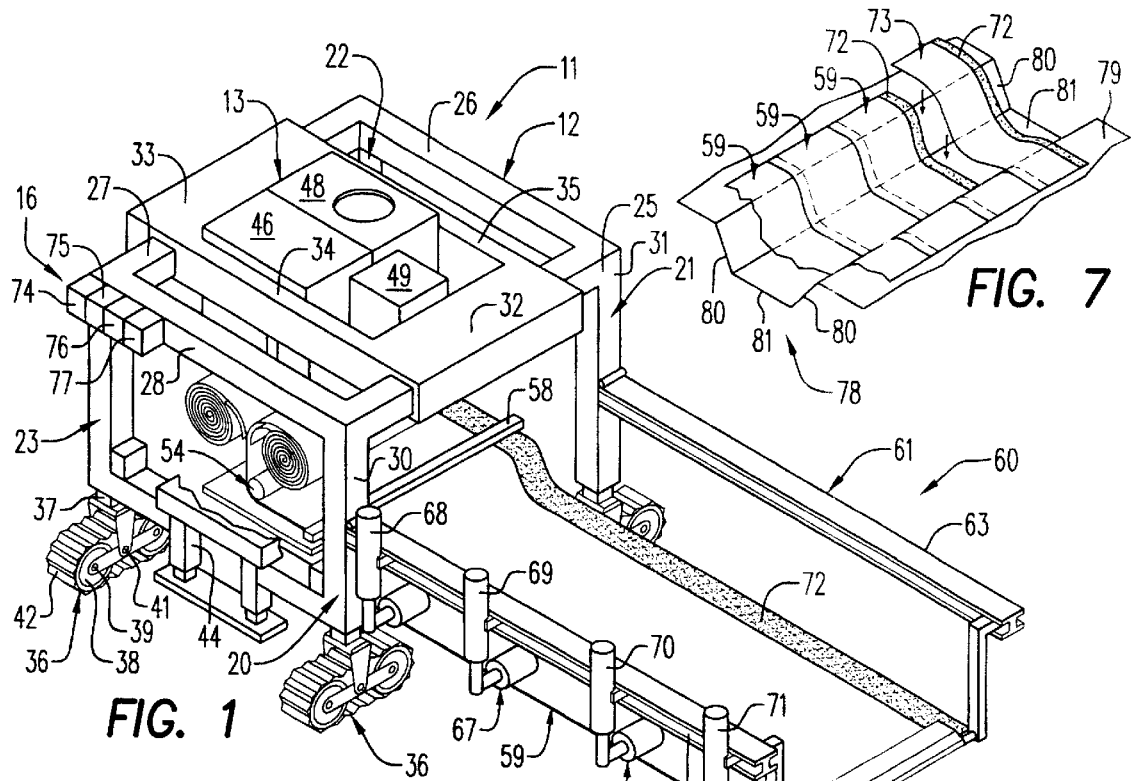
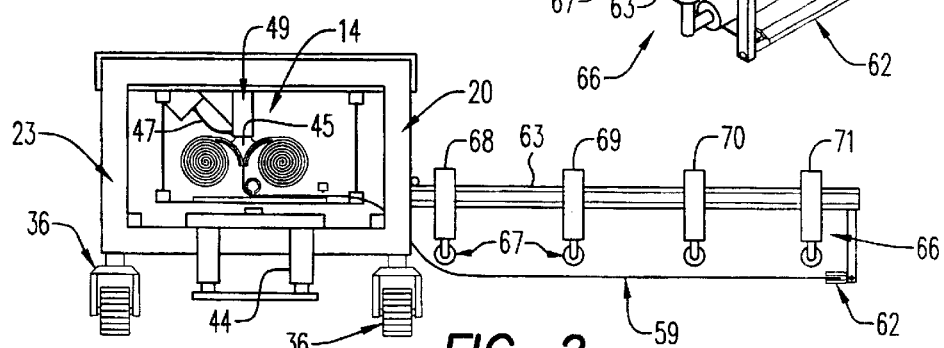
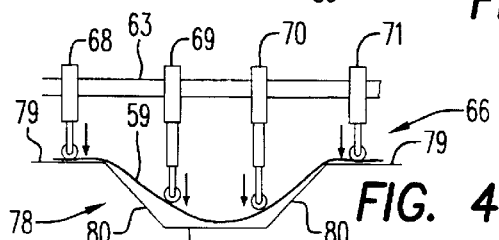
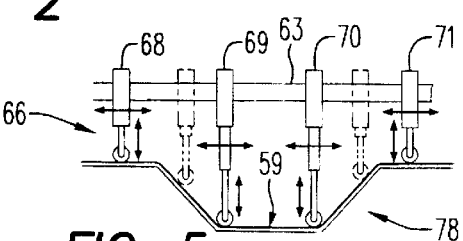
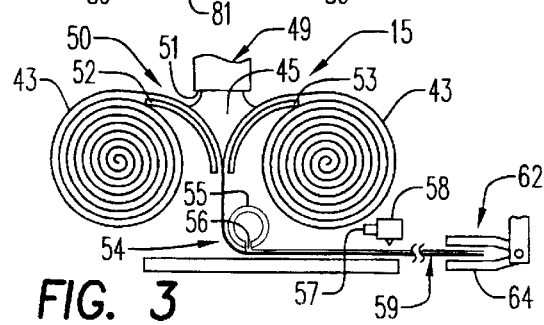
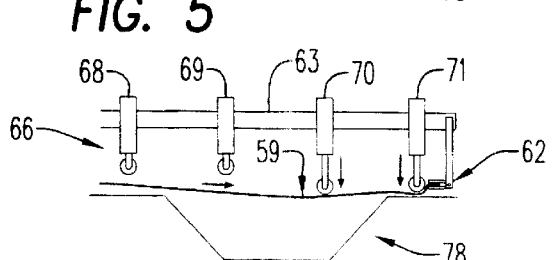

STRUCTURE FORMING METHOD, APPARATUS AND PRODUCT

This application is a continuation-in-part of pending International application No. PCT/US98/23034, filed Oct. 30, 1998, which in turn is a continuation-in-part of pending International application No. PCT/US96/15499, filed Sep. 26, 1996, which in turn is a continuation-in-part of pending International application No. PCT/US96/05132, filed May 20, 1996, which in turn is a continuation-in-part of International application No. PCT/US95/05450, filed May 4, 1995, now U.S. Pat. No. 5,725,716, which in turn is a continuation-in-part of U.S. application Ser. No. 08/239,540, filed May 9, 1994, now U.S. Pat. No. 5,496,434, which in turn is a continuation-in-part of U.S. application Ser. No. 07/870,927, filed Apr. 20, 1992, now U.S. Pat. No. 5,330,603, which in turn is a continuation-in-part of U.S. application Ser. No. 07/753,344, filed Aug. 30, 1991, now U.S. Pat. No. 5,145,282, which in turn is a continuation-in-part of U.S. application Ser. No. 521,442, filed May 10, 1990, now U.S. Pat. No. 5,049,006, which in turn is a continuation-in-part of U.S. application Ser. No. 07/417,501, filed Oct. 5, 1989, now U.S. Pat. No. 4,955,760, which in turn is a continuation-in-part of U.S. application Ser. No. 07/235,205, filed Aug. 23, 1988, now U.S. Pat. No. 4,872,784.

This invention relates to a novel continuous structure forming method and apparatus and to a new continuous structure produced thereby.

The present invention provides a novel method, apparatus and structure which overcome the shortcomings of previous expedients. In addition, the method, apparatus and structure provide features and advantages not found in earlier technology.

The method and apparatus of the present invention may be employed by individuals with only limited mechanical skills and experience. Structures can be produced by such individuals safely and efficiently without supervision utilizing the method and apparatus of the invention.

The method of the invention can be modified to form a variety of different structures with the apparatus of the invention. Variations in physical dimensions, composition and surface appearance, etc. can be achieved. Even with such changes, uniform high quality can be maintained without difficulty employing the method and apparatus of the present invention.

A novel method of the present invention for forming a substantially continuous composite structure includes the steps of preselecting a first liquid reactive resin forming material, a particulate solid additive material and a porous blanket. The additive particles are mixed with the first liquid resin forming material substantially continuously to form a substantially uniform mixture thereof. Substantially all of the additive particles are encapsulated with the first liquid resin forming material.

A porous blanket is advanced through the first liquid resin/additive mixture. Part of the mixture is migrated through the blanket substantially uniformly to form a continuous resin matrix within the blanket with the outer surfaces being adhesive.

A thin coating of a preselected second resin forming material which substantially cures immediately upon application is applied to the matrix/blanket. The second resin forming material is applied over substantially one major adhesive upper surface of the matrix/blanket while allowing an area of the adhesive upper surface to remain exposed along one edge of the upper surface.

A first preselected length of the coated matrix/blanket is positioned into a preselected final configuration while it is flexible and has an adhesive lower surface and an exposed adhesive area along one edge of the upper surface thereof.

A second preselected length of the coated matrix/blanket is positioned in an overlapping orientation with the exposed adhesive area of the first positioned length of the coated matrix/blanket. The adhesive lower surface of the second length is tightly affixed to the exposed adhesive upper area of the first positioned length.

Thereafter, a plurality of additional lengths of the coated matrix/blanket individually in succession are positioned in an overlapping orientation. Each adhesive lower surface of a coated matrix/blanket length being positioned is tightly affixed to the exposed adhesive upper area of the previously positioned length. The resulting substantially continuous composite structure has high strength and exceptional durability.

Advantageously, pressure is applied along the overlapped adhesive surfaces of adjoining lengths of the coated matrix/blanket to form a tight bond therebetween. Preferably, pressure is applied to the overlapped adhesive surfaces immediatly upon the positioning of each succeeding length of the coated matrix/blanket. It is advantageous to apply rolling pressure to the overlapped adhesive surfaces.

In a preferred sequence, pressure first is applied along a leading edge of a length of the coated matrix/blanket, followed by the application of pressure at an intermediate point along the overlapped lengths. Thereafter, the intermediate application of pressure is changed to rolling pressure along the overlapped adhesive surfaces over substantially the full length of the overlapped surfaces. It may be desirable to cut the coated matrix/blanket to a preselected length after the full length has been positioned in its final configuration and pressure applied to the overlapped surfaces thereof.

Advantageously, the positioning of the coated matrix/blanket lengths and the application of pressure to the overlapped areas is coordinated in a preselected sequence. With ditches of considerable width, the lengths of the coated matrix/blankets may be positioned across the ditch from one side to the other.

Benefits and advantages of the novel method, apparatus and composite structure of the present invention will be apparent from the following description of the accompanying drawings in which:

FIG. 1 is a view in perspective of one form of mobile continuous structure forming apparatus of the present invention;

FIG. 2 is a side view of the structure forming apparatus of the invention shown in FIG. 1;

FIG. 3 is an enlarged fragmentary side view of the matrix forming portion of the structure forming apparatus of the invention shown in FIGS. 1 and 2;

FIGS. 4, 5 and 6 are schematic illustrations of the matrix/blanket positioning portion of the structure forming apparatus of the invention during succeeding steps in the structure forming method of the invention; and FIG. 7 is a fragmentary view in perspective during the formation of a continuous composite structure of the invention.

As shown in the drawings, one form of novel mobile continuous structure forming apparatus 11 of the present invention includes a supporting portion 12, a raw material supplying portion 13, a mixing portion 14, a matrix forming portion 15 and a control portion 16.

The supporting portion 12 of the structure forming apparatus of the invention includes a plurality of spaced upstanding frame members 20,21,22,23. The frame members are adjustable in length. A plurality of generally horizontally disposed frame sections 25,26,27,28 join adjacent upper ends of the upstanding frame members. For example, as shown in the drawings, frame section 25 extends between an upper end 30 of frame member 20 and an upper end 31 of frame member 21.

Opposed frame sections 25,27 are of adjustable length. This may be accomplished as shown by dividing a frame section into two and partially overlapping adjacent free ends within a housing 32, 33.

Spaced support sections 34,35 extend between opposed frame sections 25,27 and particularly between the respective housing 32 or 33 of each opposed frame section. Components of the material supplying portion 13 as well as other components (not shown) such as an operator's seat, an electrical generator, an air compressor, a hydraulic pump and the like also can be mounted on and/or suspended from the frame sections and support sections.

Pivotable carriage means 36 extend downwardly from lower ends 37 of the upstanding frame members 20–23. Advantageously, the carriage means include wheels 38 rotatable on axles 39. The carriages preferably include variable drive means 41 and include endless track members 42. Drive means 41 advantageously adjust the length of frame members 20–23 and adjustable frame sections 25,27. Preferably, the apparatus 11 includes jack means 44 extending downwardly between the carriage means 36.

The raw material supplying portion 13 of the apparatus 11 includes a plurality of reservoirs 46 operatively connected with the supporting portion 12. The reservoirs are connected independently with the mixing portion 14, preferably through flexible conduit means 47. The raw material supplying portion advantageously also includes gravity feed hoppers 48 adjacent the mixing portion 14 and preferably heating means along the length of the conduit means.

The mixing portion 14 of the structure forming apparatus 11 of the invention includes an elongated mixing chamber 49 adjustably disposed on the supporting portion 12. The mixing chamber 49 preferably is interconnected with a hopper 48 through an auger (not shown).

The matrix forming portion 15 of the apparatus 11 includes first mixture distributing means 50 adjacent an outlet 51 of the mixing chamber 49 and adjustable downwardly therefrom. The first mixture distributing means 50 as shown in the drawings includes a pair of spaced elongated transversely disposed arcuate members 52,53 disposed with generally horizontal lower edges adjustably oriented closer together than upper edges thereof.

The matrix forming portion also includes second mixture distributing means 54 adjacent the first mixture distributing means. The second mixture distributing means advantageously is disposed in a generally horizontal orientation. Preferably, the second mixture distributing means includes a tubular member 55 with a narrow slot 56 along its length disposed generally transversely of the movement of a blanket through the apparatus 11. Alternatively, the second mixture distributing means may include an orifice 57 mounted on a reciprocating cutter mechanism 58.

Positioning means 60 is disposed adjacent the second mixture distributing means 54 for placement of a structure 59 in a preselected final configuration while the structure is flexible and adhesive. The positioning means extends outwardly from the supporting portion 12. As shown in the drawings, the positioning means includes a cantilevered frame assembly 61 extending from upstanding frame members 20,21 and pivotally connected thereto.

Positioning means 60 may include elongated structure grasping means 62 translatably movable along the cantilevered frame assembly 61 extending from the supporting portion 12. Advantageously, the elongated structure grasping means 62 extends between and travels along spaced parallel side rails 63 of the frame assembly 61. The elongated structure grasping means 62 preferably includes a pair of cooperating hinged sections 64. The travel of the grasping means 62 advantageously is coordinated to equalize the tension across a structure being placed into a preselected final configuration.

Pressure applying means 66 is disposed adjacent the positioning means 60. The pressure applying means advantageously includes roller means 67 which as shown may be disposed along one edge of the cantilevered frame asssembly 61. Preferably, the pressure applying means 66 includes spaced roller asssemblies 68–71 independently movable in a generally vertical plane. The pressure applying means 66 advantageously are disposed above the coated matrix/blanket 59 being advanced along the frame assembly 61. The operation of the pressure applying means preferably is coordinated with the travel of the elongated structure grasping means 62.

To form a continuous composite structure employing the method and apparatus of the invention as shown in the drawings, a first liquid reactive resin forming material is advanced from a reservoir 46 through a conduit 47 into mixing chamber 49. Simultaneously, other minor ingredients e.g. colors, catalysts, etc. from other reservoirs (not shown) advance through conduits into the mixing chamber.

At the same time, a particulate solid additive material from a hopper 48 enters the mixing chamber 49. The additive particles are mixed with the first liquid resin forming material substantially continuously, preferably in a proportion significantly greater than that of the resin forming material. During this mixing operation, substantially all of the additive particles are encapsulated with the liquid resin forming material to a preselected thickness.

The resulting mixture being delivered from outlet 51 of the mixing chamber 49 passes downwardly between arcuate members 52,53 into contact with a porous blanket or blankets 43 moving therethrough. The mixture is delivered at a rate sufficient to form a residual pool 45 between the arcuate members. As the blanket exits the liquid pool, part of the mixture migrates through the blanket substantially uniformly to form a continuous resin matrix within the blanket with the outer surfaces being adhesive.

As the treated blanket passes the second mixture distributing means 54, a thin coating of a second resin forming material which cures immediately is applied to the matrix/blanket. As shown in FIG. 1, the thin coating is applied over substantially one entire major adhesive upper surface while allowing an area 72 of the adhesive upper surface to remain exposed along one edge of the of the upper surface.

The coated matrix/blanket then is advanced by grasping means 62 and placed into a preselected final configuration such as a path or ditch while it is flexible and has an adhesive lower surface and an adhesive area along one edge of the exposed upper surface with the remainder being a thin cured coating of the second resin forming material. Preferably, the adhesive lower surface is in contact with a firm base surface such as concrete or packed soil or gravel.

As each length of the coated matrix/blanket is positioned to partially overlap the previously positioned length, pressure is applied to the overlapped area. Advantageously, this is accomplished with a plurality of roller assemblies 68–71. These roller assemblies are spaced along one edge of the cantilevered frame assembly 61. During the operation of the grasping means 62, the rollers 67 are located above the matrix/blanket 59 being advanced along the frame assembly.

When the matrix/blanket is properly positioned in its preselected final configuration, each of the independently movable rollers 67 is moved downwardly to engage the surface of the matrix/blanket. If the matrix/blanket is positioned over a ditch 78 as shown in FIG. 4, the roller assemblies 68 and 71 will pin the ends against the banks 79 of the ditch while roller asemblies 69 and 70 push the unsupported center of the blanket against the sidewalls 80 and bottom 81 of the ditch (FIG. 5). Next the roller assemblies 69,70 are moved along the overlapped area until the entire length thereof has been pressed tightly together and to the ditch bottom.

Alternatively, when the leading edge of the matrix/blanket has been placed in its final configuration, roller assembly 71 can pin it to the ditch bank before the length has been cut (FIG. 6). In this case, roller assembly 70 can push the blanket against the ditch bottom followed by roller assembly 69 until the overlapped area is tightly pressed together against the ditch bottom and sidewalls. Finally, with roller assembly 68 pinning the rear portion of the blanket to the bank, the cutter 58 is activated to cut the matrix/blanket precisely into the required length.

Thereafter, additional lengths 73 of the coated matrix/blanket are individually positioned in succession into an overlapping orientation (FIG. 7). The lower adhesive surface of the length being positioned is tightly affixed to the exposed adhesive area 72 of each previously positioned length by applying pressure to the overlapped adhesive surfaces with rollers 68–71. As shown, each length of the coated matrix/blanket is positioned in overlapping succession to form a substantially continuous composite structure with high strength and exceptional durability.

To produce high quality continuous composite structures of the invention, it is important that all of the steps be carefully coordinated by control portion 16. The control portion 16 of the structure forming apparatus 11 of the invention includes programmable memory means 74 and actuating means 75 responsive thereto in combination with coordinating means 76 to control the operation of the various components of apparatus 11. Preferably, the coordinating means includes a process controller 77 that initiates changes in the flows of materials and speeds of drives to bring variations therein back to the rates specified in the programs present in the memory 74.

This coordination commonly is achieved through the transmission of information such as digital pulses from monitors and/or sensors at the control components to the process controller 77. The operating information is compared with the preselected programming parameters stored in the memory 74. If differences are detected, instructions from the controller change the operation of the components to restore the various operations to the preselected processing specifications.

The above procedure provides a substantially continuous multilayer composite structure with a thin layer of an instanteously cured second resin over a continuous first resin rich upper layer over a thicker central layer including a plurality of encapsulated solid particles e.g. gravel, particles from grinding discarded tires etc., within a continuous first resin matrix. The resin matrix extends throughout the structure from the resin rich upper layer through the particle rich central layer downwardly through blanket 43 and into a resin rich lower layer including a few very small solid particles disposed primarily closely adjacent to the blanket.

Normal maneuvering of the continuous structure forming apparatus of the invention to maintain it close to a preselected path ordinarily can be accomplished by increasing the speed of the carriages 36 on one side and/or decreasing the speed of the carriages on the other side. Major transverse changes of direction may be accomplished by pivoting the carriages 36 ninety degrees from the normal operating orientation using jacks 44 to raise the carriages off the ground. The apparatus then is moved sideways into a desired position at which point, the jacks 44 again raise the carriages 36 so they can be pivoted back to an orientation parallel to its original position.

The same steps can be employed to move the apparatus around obstacles such as bridges, trees, head gates, etc. To change the width of the apparatus, the two carriages on one side can be pivoted and driven away from or toward the center of the apparatus and thereby lengthen or shorten the adjustable frame sections 25, 27.

The reactive resin forming materials employed to produce composite structures of the invention are selected to be capable of reaction to form the particular resin matrix or coating desired in the final structure. Advantageously, the materials form thermosetting resins such as a polyurethane or polyester. Should a polyurethane be desired, one reservoir may contain an isocyanate and another reservoir may contain a polyol.

More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be premixed with one of the resin formers, e.g. fillers, reinforcements, colors and the like.

The particulate solid additive material is mixed with the first liquid reactive resin forming material substantially continuously, preferably in a proportion significantly greater than that of the resin forming material. The additive particles may be any of a wide variety of inexpensive materials readily available at a particular job site. Natural mineral particulate materials such as sand and gravel normally are available or can be produced simply by crushing rock at the site.

Also, materials such as waste or recycled materials which can be shredded or ground into particles of suitable size can be utilized. Particularly useful are particles formed by shredding or grinding discarded tires. Since the particles are encapsulated with the first resin forming material and not saturated therewith, many different waste materials may be employed.

Suitable porous blankets include woven, knit, nonwoven structures, etc. The blankets e.g. fabrics, mats, etc. may be formed of continuous or discontinuous fibers, yarns, slit ribbons and similar natural and synthetic fibrous materials. Reinforcing members such as ropes, cables and the like that extend longitudinally and/or transversely of the blanket centerline may be included if desired.

The above description and the accompanying drawings show that the present invention provides a novel method, apparatus and composite structure which overcome the shortcomings of previous expedients and in addition, provide features and advantages not found in earlier technology.

The composite structure produced with the method and apparatus of the invention can include major proportions of recycled, waste or other materials which are readily available at a job site. These structures are of high quality and may exhibit properties not usually found in products formed with conventional ingredients.

The method of the invention may be conducted by individuals with only limited mechanical skills and experience to produce high quality structures safely and efficiently. The method can be modified to form a variety of different structures. Variations in configuration, composition, physical dimensions and surface appearance, etc. can be achieved easily. Even with such changes, uniformity and high quality can be maintained without difficulty.

It will be apparent that various modifications can be made in the particular method, apparatus and composite structure described in detail above and shown in the drawings within the scope of the present invention. The method steps, apparatus components and types of materials employed can be changed to meet specific process and structural requirements.

These and other changes can be made in the method, apparatus and composite structure of the invention provided the functioning and operation thereof are not adversely affected. Therefore, the scope of the present invention is to be limited only by the following claims.

What is claimed is:

1. A method of forming a continuous composite structure including the steps of preselecting a first liquid reactive resin forming material, a particulate solid additive material and a porous blanket, mixing said additive particles with said first liquid resin forming material substantially continuously to form a substantially uniform mixture thereof, encapsulating substantially all of said additive particles with said first liquid resin forming material, advancing said porous blanket through said liquid resin/additive mixture, migrating part of said mixture through said blanket substantially uniformly to form a continuous resin matrix within said blanket with adhesive outer surfaces, preselecting a second resin forming material which substantially cures immediately upon application and is compatible and reactive with said adhesive first resin forming material, applying a thin coating of said second resin forming material over substantially one major adhesive upper surface of said matrix/blanket while allowing an area of said adhesive surface to remain exposed along one edge of said upper surface thereof, positioning a first preselected length of said coated matrix/blanket into a preselected final configuration while it is flexible and has an adhesive lower surface in contact with a firm base surface and an exposed adhesive area along one edge of said upper surface thereof, positioning a second preselected length of said coated matrix/blanket in an overlapping orientation with said exposed adhesive area of said first positioned length of said coated matrix/blanket, tightly affixing said adhesive lower surface of said second length to said exposed adhesive area of said first length and the remaining portion of said adhesive lower surface to said firm base surface, and successively positioning and tightly affixing together a plurality of additional lengths of said coated matrix/blanket in overlapping orientation to form a substantially continuous composite structure with high strength and exceptional durability tightly affixed to said firm base surface.

2. A method of forming a continuous composite structure according to claim 1 including the step of applying pressure along said overlapped adhesive surfaces of adjoining lengths of said coated matrix/blanket to form a tight bond therebetween.

3. A method of forming a continuous composite structure according to claim 2 wherein pressure is applied along said overlapped adhesive surfaces immediately upon the positioning of each succeeding length of said coated matrix/blanket in an overlapped relationship.

4. A method of forming a continuous composite structure according to claim 2 including applying rolling pressure to said overlapped adhesive surfaces.

5. A method of forming a continuous composite structure according to claim 2 wherein pressure first is applied along a leading edge of said length of said coated matrix/blanket, followed by applying pressure intermediate of said length, and changing said intermediate pressure to rolling pressure along said overlapped adhesive surfaces over substantially the full length thereof.

6. A method of forming a continuous composite structure according to claim 1 including the step of positioning said coated matrix/blanket lengths across a ditch.

7. A method of forming a continuous composite structure according to claim 2 wherein said positioning of said coated matrix/blanket lengths and applying pressure thereto are coordinated in a preselected sequence.

8. Mobile continuous structure forming apparatus including a supporting portion, a raw material supplying portion, a mixing portion, a matrix forming portion and a control portion; said supporting portion including a plurality of spaced upstanding frame members of adjustable length, a plurality of generally horizontally disposed frame sections joining adjacent upper ends of said upstanding frame members, one pair of opposed frame sections being of adjustable length, support sections extending between said adjustable opposed pair of said frame sections, pivotable carriage means extending downwardly from lower ends of said upstanding frame members; said raw material supplying portion including a plurality of reservoirs operatively connected with said supporting portion, said reservoirs being connected independently with said mixing portion; said mixing portion extending from said supporting portion, said mixing portion including an elongated mixing chamber adjustably disposed adjacent said supporting portion; said matrix forming portion including first mixture distributing means extending adjustably downwardly from said mixing chamber and being disposed adjacent an outlet thereof, second mixture distributing means disposed adjacent said first mixture distributing means, positioning means disposed adjacent said second mixture distributing means for placement of a structure in a preselected final configuration, pressure applying means disposed adjacent said positioning means; said control portion including programmable memory means, coordinating means, sensing means, actuating means, and circuitry transmitting signals from said sensing means to said coordinating means for comparison with said memory means and activation of said actuating means to form and place a continuous structure into a preselected final configuration while it is flexible and adhesive.

9. Mobile continuous structure forming apparatus according to claim 8 wherein said pressure applying means includes roller means.

10. Mobile continuous structure forming apparatus according to claim 8 wherein said positioning means includes sensing means and actuating means.

11. Mobile continuous structure forming apparatus according to claim 8 wherein said positioning means extends from said supporting portion.

12. Mobile continuous structure forming apparatus according to claim 11 wherein said positioning means includes elongated structure grasping means translatably movable along a generally horizontally disposed frame section.

13. Mobile continuous structure forming apparatus according to claim 12 including pressure applying means disposed along one edge of said frame section.

14. Mobile continuous structure forming apparatus according to claim 9 wherein said pressure applying means includes spaced roller means independently movable in a vertical plane.

15. Mobile continuous structure forming apparatus according to claim 14 wherein at least one of said roller means includes reversible driven roller means.

16. Mobile continuous structure forming apparatus according to claim 12 wherein said elongated structure grasping means includes a pair of cooperating hinged sections.

17. Mobile continuous structure forming apparatus according to claim 16 wherein said elongated structure grasping means extends between and travels along spaced parallel side rails of said frame section.

18. Mobile continuous structure forming apparatus according to claim 17 including control means coordinating the travel of said elongated structure grasping means to equalize the tension across a structure being advanced along a preselected path.

19. Mobile continuous structure forming apparatus according to claim 12 including control means coordinating the operation of said pressure applying means with the travel of said elongated structure grasping means.

* * * * *